United States Patent
Ruppert

(10) Patent No.: US 9,566,674 B2
(45) Date of Patent: Feb. 14, 2017

(54) METHOD FOR MOUNTING COMPONENTS ON A SUPPORTING RAIL

(75) Inventor: Jens Ruppert, Steinheim (DE)

(73) Assignee: PHOENIX CONTACT GMBH & CO. KG, Blomberg (DE)

(*) Notice: Subject to any disclaimer, the term of this patent is extended or adjusted under 35 U.S.C. 154(b) by 926 days.

(21) Appl. No.: 13/877,674

(22) PCT Filed: Sep. 30, 2011

(86) PCT No.: PCT/EP2011/004927
§ 371 (c)(1),
(2), (4) Date: Apr. 4, 2013

(87) PCT Pub. No.: WO2012/045432
PCT Pub. Date: Apr. 12, 2012

(65) Prior Publication Data
US 2013/0205566 A1   Aug. 15, 2013

(30) Foreign Application Priority Data

Oct. 5, 2010  (DE) .................. 10 2010 047 369

(51) Int. Cl.
| | |
|---|---|
| H05K 3/30 | (2006.01) |
| B23P 19/00 | (2006.01) |
| H01R 9/26 | (2006.01) |
| H01R 43/00 | (2006.01) |

(52) U.S. Cl.
CPC .................. B23P 19/00 (2013.01); H01R 9/26 (2013.01); H01R 43/00 (2013.01); *Y10T 29/49826* (2015.01); *Y10T 29/53* (2015.01)

(58) Field of Classification Search
CPC .................. H01L 24/27; Y10T 29/4913; Y10T 29/53174; Y10T 29/53261; Y10T 29/49826; Y10T 29/53

USPC ......... 29/832, 428, 739, 759, 857, 874, 876; 221/213, 226, 238, 258, 268, 297

See application file for complete search history.

(56) References Cited

U.S. PATENT DOCUMENTS

| | | | | |
|---|---|---|---|---|
| 7,694,847 | B2* | 4/2010 | Iwamoto ............... | B23P 19/003 221/213 |
| 2006/0283011 | A1 | 12/2006 | Muller et al. | |

FOREIGN PATENT DOCUMENTS

| | | |
|---|---|---|
| DE | 10201637 U1 | 4/2003 |
| EP | 0158437 A2 | 10/1985 |
| EP | 1629706 A1 | 3/2006 |
| WO | WO 2010057768 A1 | 5/2010 |

\* cited by examiner

*Primary Examiner* — Thiem Phan
(74) *Attorney, Agent, or Firm* — Leydig, Voit & Mayer, Ltd.

(57) ABSTRACT

A method for mounting components, in particular terminal blocks, on a supporting rail, wherein the components are removed from at least one magazine by means of a first device, which comprises a receptacle for the components and moves automatically to and fro between a starting position and an end position, and are plugged onto the supporting rail, which is held in a first mounting position by a second device, includes the second device automatically transferring the supporting rail into a second mounting position after one of the components has been plugged on and a further component, which is arranged next to said component in the longitudinal direction of the supporting rail when the latter is in the fully equipped state, is plugged onto the supporting rail held in the second mounting position, in an analogous manner to the component.

6 Claims, 6 Drawing Sheets

METHOD FOR MOUNTING COMPONENTS ON A SUPPORTING RAIL

CROSS REFERENCE TO RELATED APPLICATIONS

This application is a U.S. national phase application under 35 U.S.C. §371 of International Application No. PCT/EP2011/004927, filed on Sep. 30, 2011, and claims benefit to German Patent Application No. DE 10 2010 047 369.3, filed on Oct. 5, 2010. The international application was published in German on Apr. 12, 2012, as WO 2012/045432 A1 under PCT Article 21(2).

FIELD

The present invention relates to a method and a system for mounting components, for example terminal blocks, on a support rail.

BACKGROUND

A method and a system for mounting components on a support rail are, for example, already known from WO 2010/057768 A1. In the known method, the components constructed as terminal blocks are removed from a magazine and placed onto a support rail by means of a first device constructed as a 6-axis robot. For this purpose, the support rail is retained in a first mounting position on a spatially fixed second device, which is constructed as a retaining plate. All the necessary movements are performed by the robot, which, for this purpose, comprises a receiving means for the components which is formed as a movable gripper.

SUMMARY

In an embodiment, the present invention provides a method for mounting components, in particular terminal blocks, on a support rail, the components being removed from at least one magazine and placed onto the support rail retained in a first mounting position by a second device by means of a first device which has a receiving means for the components and moves in an automatic and reciprocating manner between a starting position and an end position, wherein the second device automatically transfers the support rail into a second mounting position after the placing of one of the components, and a further component which is arranged adjacently to this component in the longitudinal direction of the support rail in the fully loaded state thereof is, in a similar manner to the component, placed onto the support rail retained in the second mounting position.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
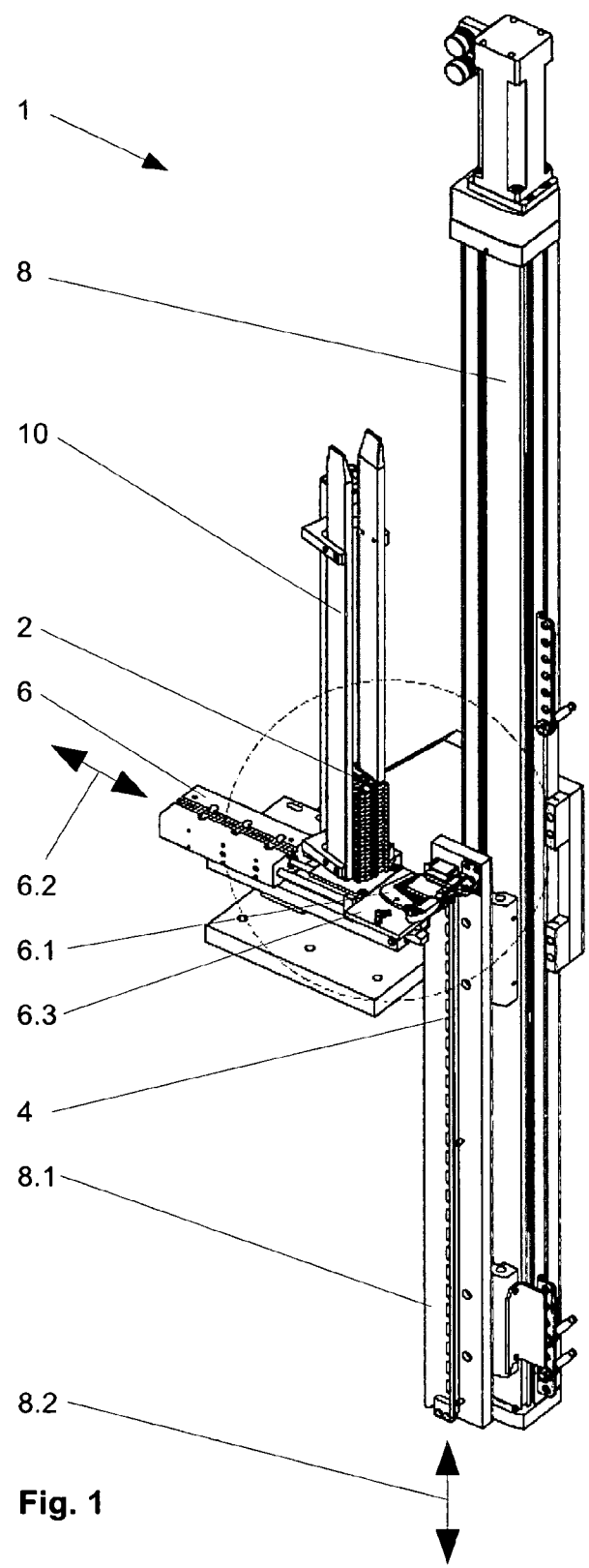
FIG. 1 is a first embodiment of a system according to an embodiment of the invention in a perspective view of the position of use.

The present invention addresses the problem of providing a method and a system for carrying out the method by way of which mounting is effected more quickly in a system having a more compact construction.

An advantage of the method according to the invention resides in particular in the facts that mounting is effected more quickly and that the system has a more compact construction. In addition, the mounting procedures can be simplified in such a way that a less complex construction of the first device is possible. Instead of a very complex first device, for example a 6-axis robot, two simpler first and second devices can be used for the method according to the invention.

In a particularly advantageous development of the method according to the invention, the second device positions the support rail in the mounting positions relative to the first device in such a way that the first device removes one of the components from the magazine and carries said component to the support rail by means of a single linear movement during transfer from the starting position into the end position. This greatly simplifies the movement sequence of the first device, such that the first device is very simple in terms of its structure and with respect to the electrical control and can thus be produced in a cost-effective manner.

In principle, the placing of the components by the first device onto the support rail can be freely selected within wide, suitable limits in terms of the movement sequence. Expediently, the single linear movement of the first device according to the above-mentioned embodiment brings the component and the support bar into contact in the edge regions thereof with respect to one another in a first movement portion and rotates the component about the thus formed pivot into an end position relative to the support rail in a second movement portion. In this manner it is possible, despite a simple movement of the first device, to produce a more complex movement sequence when mounting the components on the support rail.

In a development of the above-mentioned method, during the second movement portion, the single linear movement of the first device transfers the component first into an intermediate position and, after a period of time, into the end position, thereby allowing tolerances of the components and of the support rail to be equalised.

In a particularly advantageous development of the two methods last mentioned, the first device, at the end of the single linear movement and prior to being transferred back into the starting position, remains in the end position for a predetermined waiting time, during which the second device presses the components already placed on the support bar against the first device with a predetermined force. In this manner it is possible, without additional devices, to bring the individual components placed on the support bar into close contact with one another, notwithstanding the play required for problem-free mounting.

In principle, the construction of the two devices can be freely selected within wide, suitable limits in terms of type, size, spatial assignment with respect to one another and movement sequence.

In a particularly advantageous development of the system according to the invention, the two devices are constructed so as to match one another in such a way that the first device can remove one of the components from the magazine and carry said component to the support rail in a single linear movement during transfer into the end position. In this manner, the first device can be produced in a particularly simple manner in terms of its structure and circuitry.

In principle, the manner in which the receiving means is arranged on the remainder of the first device can be freely selected within wide, suitable limits. Advantageously, the receiving means is rotatably arranged on the remainder of the first device, thereby rendering it possible for a simple movement of the first device to be converted into a more complex overall movement sequence.

In an advantageous development of the system, the first device comprises a sliding guide and a sliding block, one of the two sliding parts being arranged on the movable part and one on the immovable part of the first device. In this manner it is possible to transfer the components placed onto the support rail from an intermediate position into an end position in a structurally particularly simple manner.

In a further advantageous development, the first device comprises a bearing portion on which the component bears during mounting on the support rail. A defined orientation of the component with respect to the first device, on one hand, and a stop for a pushing-together of the individual components of the support bar, one the other hand, are thereby achieved in a structurally simple manner.

In principle, the second device can be freely selected within wide, suitable limits in terms of type, complexity, orientation with respect to the first device and movement sequence. The second device advantageously has a drive which moves the second device between the first and second mounting positions in a solely linear manner. In this manner, the second device is produced in a particularly simple manner in terms of its structure and circuitry.

In another advantageous development, the second device comprises at least one bolt-like or hook-like projection for retaining the support rail, thereby achieving retention in a particularly simple manner of correspondingly constructed support rails.

In principle, the spatial orientation of the two devices with respect to one another can be freely selected within wide, suitable limits. Expediently, the two devices are spatially arranged with respect to one another in the position of use in such a way that the movement axes, along which the movements carried out by the two devices travel, are substantially perpendicular to one another. In this manner it is possible to achieve particularly simple movement geometries and thus movement sequences in the case of the two devices.

In an advantageous development of the above-mentioned embodiment, the movement axis of the first device extends substantially horizontally and that of the second device extends substantially vertically. This allows a simple and compact design for the system.

In a particularly advantageous development, the second device is retained on a support rail which is linearly movable on a cross-beam. In this manner it is possible for the second device to be able to carry the support rail retained thereon to a plurality of magazines, arranged side by side, and to corresponding first devices.

FIG. 1 shows a first embodiment of a system 1 according to the invention.

The system 1 according to the invention, for mounting components 2 on a support rail 4 comprises a first device 6, a second device 8 and a magazine 10.

In this case, the first device 6 is constructed as a linear drive, for example as a servo shaft, which can be moved automatically and in a reciprocating manner between a starting position and an end position, the first device 6 carrying out a single linear movement when transferring into the end position. In the starting position (not shown), the first device 6 is located on the side of the magazine 10 which faces away from the second device 8.

Components 2 are stored in the magazine 10. These components 2 may be like or different components 2.

As the first device 6 transfers from the starting position into the end position, a receiving means 6.1, which is rotatably arranged on the remainder of the first device 6, removes the lowest component 2 from the magazine 10 and carries said component to the support rail 4 in a single linear movement.

In this case, the support rail 4 is detachably retained on the second device 8. The second device 8 is in this case likewise constructed as a linear drive, for example as a servo shaft, which moves the second device 8 in a solely linear manner. A movable runner 8.1 is arranged on the remainder of the second device 8 and the support rail 4 is detachably fixed thereto.

In the present embodiment, the first device 6 is substantially horizontal and the second device 8 is substantially vertical, such that the movement axes, along which the movements carried out by the two devices 6, 8 travel, are substantially perpendicular to one another. The movement axes extend parallel to the longitudinal axes of the two devices 6, 8 and are depicted in FIG. 1 by means of double-headed arrows 6.2 and 8.2.

Figure 2:
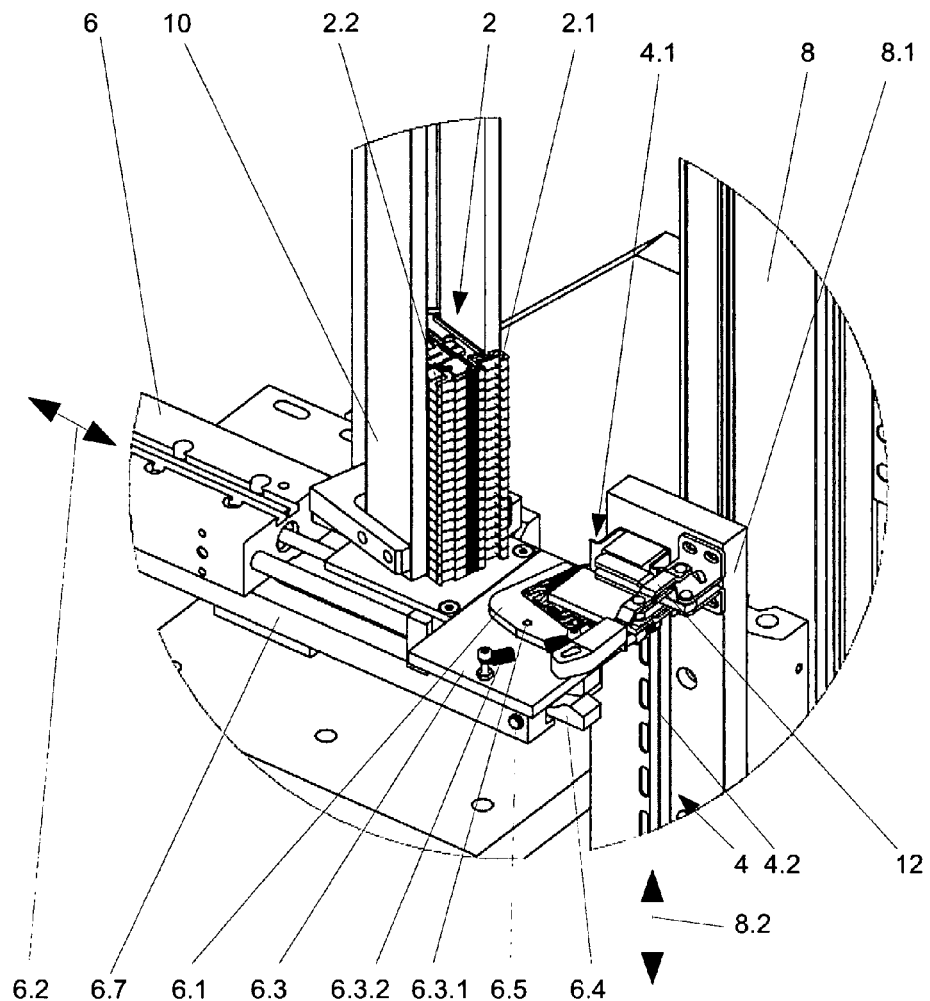
FIG. 2 shows the first embodiment in a detailed view of the region circled in FIG. 1.

FIG. 2 is an enlarged view of the region circled in FIG. 1. As can be seen, the support rail 4 is what is known as a top hat rail, which is detachably retained by a clamping device 12 on the runner 8.1.

Since the top hat rail 4 is constructed as a perforated rail, an alternative fixing means would be to detachably retain the support rail 4 constructed as a perforated rail on the second device 8 by means of at least one bolt-like or hook-like projection arranged on the runner 8.1.

As can clearly be seen from FIG. 2, the first device 6 is located in an intermediate position between the starting position and the end position. The components 2 are what are known as terminal blocks, which can be clipped onto the top hat rail 4 in a manner known to a person skilled in the art. For this purpose, the terminal block 2 located in the receiving means 6.1 is, as shown in FIG. 2, brought into engagement via a hook-like projection 2.1 with the one projecting edge region 4.1 of the top hat rail 4, in the first movement portion, and is rotated by the receiving means 6.1 about the thus formed pivot by means of the further movement of the first device 6 towards the end position, in the second movement portion, and clipped using another hook-like projection 6.2 over the other projecting edge region 4.2 of the top hat rail 4.

While the component 2 is being carried from the magazine 10 to the top hat rail 4 and during mounting of the component 2, the component 2 rests on a bearing portion 6.3, constructed as a retaining plate, of the first device 6. The receiving means 6.1 is rotatably mounted on the retaining plate 6.3 by a bolt 6.3.1 and is pretensioned by means of a spring 6.3.2 (shown in part) in the position shown in FIG. 2.

Figure 3:
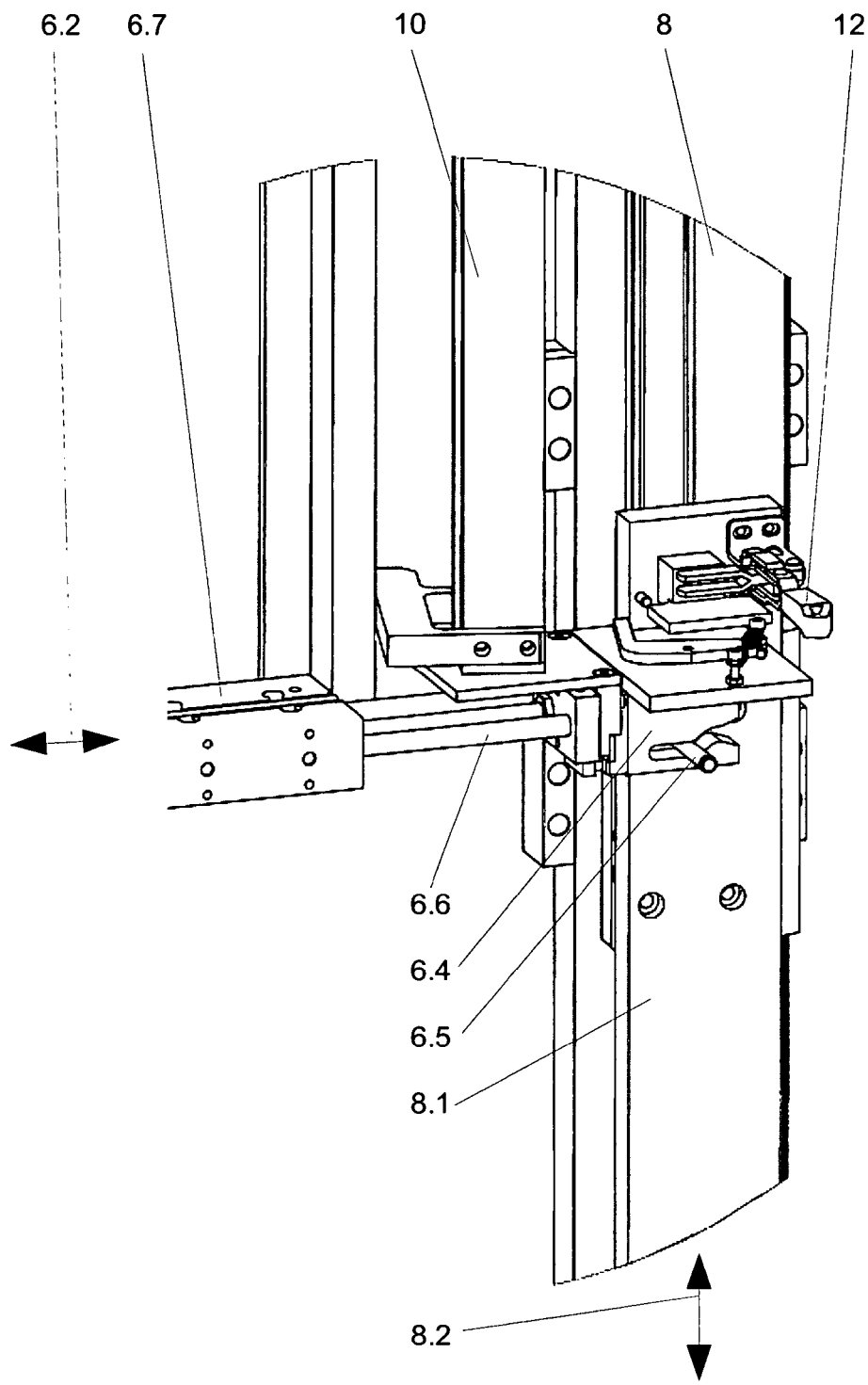
FIG. 3 shows the first embodiment in a view which is rotated with respect to FIG. 2.

For the sake of clarity, the support rail 4 constructed as a top hat rail is not shown in FIG. 3. As can be seen from FIG. 3, the first device 6 comprises a sliding guide 6.4 and a sliding block 6.5, the sliding guide 6.4 being arranged on the movable part 6.6 and the sliding block 6.5 being arranged on the immovable part 6.7 of the first device 6. For the sake of clarity, the cross-beam, of the immovable part 6.7, retaining the sliding block 6.5 is not shown.

In the following, the mode of operation of the method according to the invention is described on the basis of the first embodiment.

The magazine 10 is loaded with components 2 and the first device 6 is located in the starting position. The support rail 2 constructed as a top hat rail is detachably retained on the runner 8.1 by the clamping device 12; the drive (not shown in detail) of the second device 8 has transferred the runner 8.1 with the support rail 4 along the movement axis 8.2 into the first mounting position shown in FIG. 1.

The drive (not shown in detail) of the first device 6 transfers said first device from the starting position into the end position along the movement axis 6.2. In the process, the first device 6 uses the receiving means 6.1 to remove the lowest component 2 from the magazine 10 and transfers said lowest component 2 in a first movement portion into the position shown in FIGS. 1 and 2, in which position the component 2 and the support rail 4 are in contact in the edge regions thereof with respect to one another.

In a second movement portion of the single linear movement of the first device 6 during transfer into the end position, the component 2 is transferred about the thus formed pivot into an intermediate position relative to the support bar 4, the component 2 engaging with the support bar 4 in a manner known to a person skilled in the art.

During the above-mentioned single linear movement of the first device 6, the sliding guide 6.4 of the movable part 6.6 comes into engagement with the sliding block 6.5 of the immovable part 6.7 of the first device 6. In this manner the component 2 is transferred into the end position thereof; upwardly in the present embodiment, in the plane of the page of FIG. 3. It is hereby ensured that the component 2 is mounted with sufficient spacing from components 2 already placed on the support rail 4, in order to thus prevent collisions between the already placed components 2 and the component 2 currently being mounted. For example, tolerances of the components 2 and/or of the support rail 4 can cause components 2 which have already been placed onto the support rail 4 to hang downwards slightly, in the plane of the page of FIG. 1, due to gravity.

As soon as the component 2 has been fully placed onto the support rail 4, the first device 6 is located in the end position. Prior to being transferred back into the starting position, the first device 6 remains in the end position for a predetermined waiting time, during which the second device 8 presses the components 2 which have already been placed on the support rail 4 against the bearing portion 6.3 of the first device 6 with a predetermined force. This ensures that the components 2 which are arranged side by side in the longitudinal direction of the support rail 4 in the fully loaded state thereof abut one another without gaps.

After a period of time, the second device 8 transfers the support rail 4 into the second mounting position (not shown) and the cycle for mounting a component 2 is complete. During the next cycle, a further component 2 which is arranged adjacently to this component 2 in the longitudinal direction of the support rail 4 in the fully loaded state thereof can thereby, in a similar manner to the component 2, be placed onto the support rail 4 retained in the second mounting position.

Figure 4:
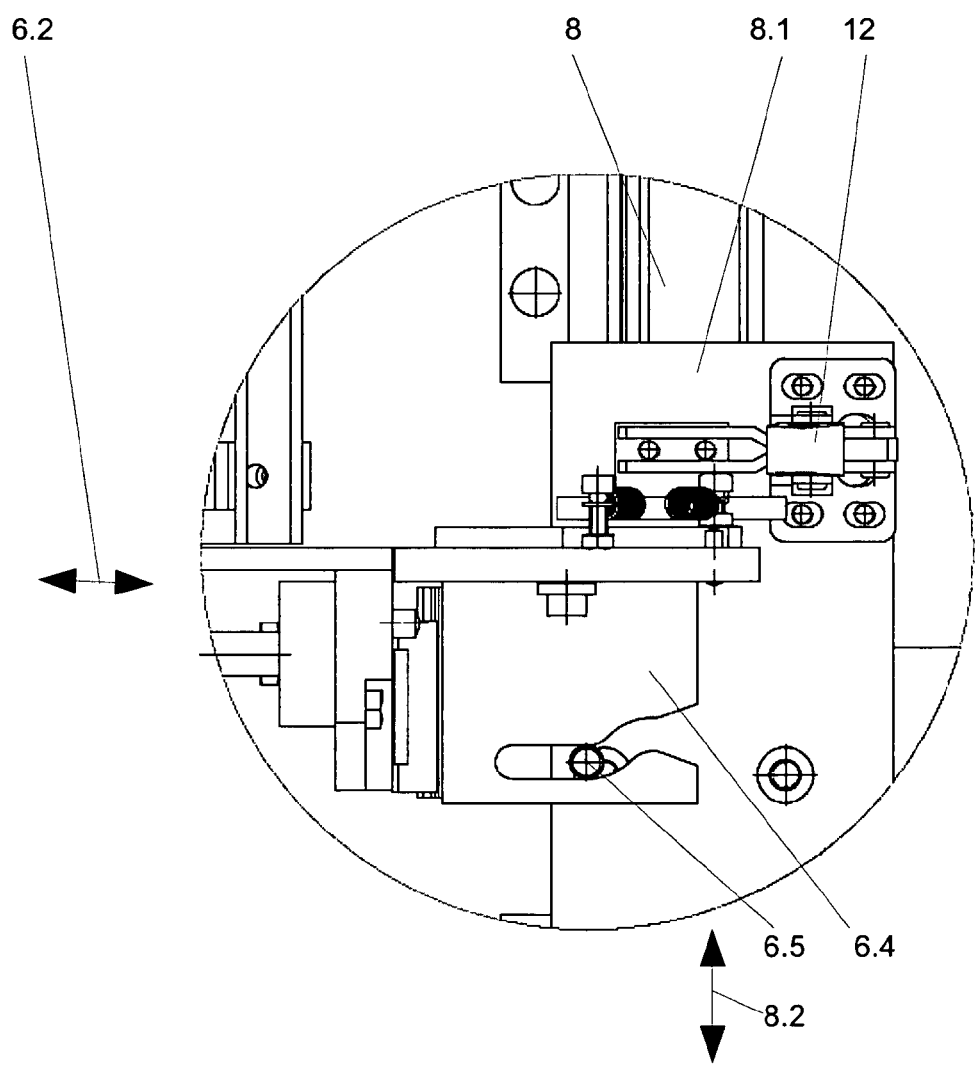
FIG. 4 shows a side view of the detail from FIG. 3, with the sliding guide visible.

FIG. 4 shows the detail according to FIG. 3 in a side view.

Figure 5:
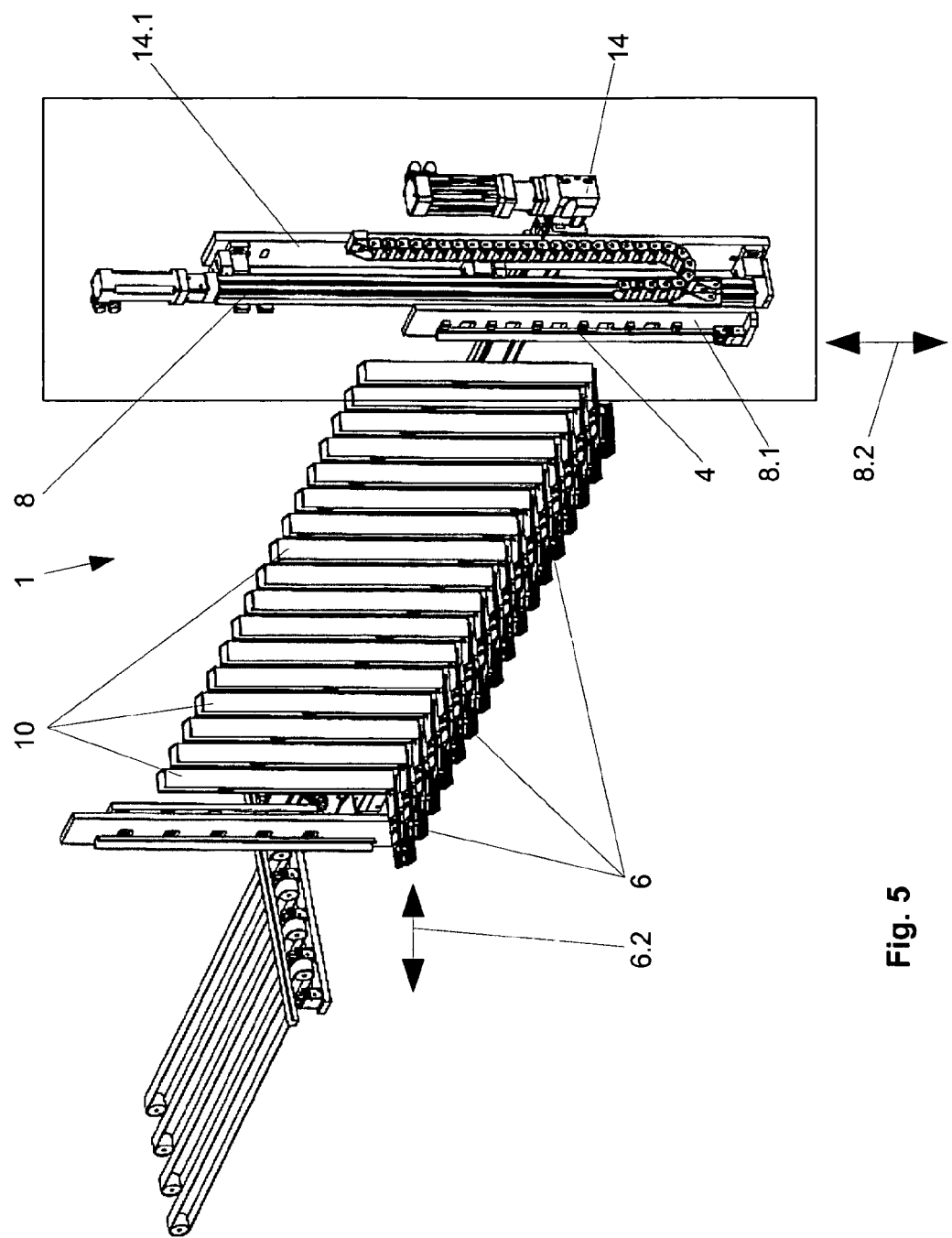
FIG. 5 is a perspective view of a second embodiment of the system according to the invention in the position of use.

FIG. 5 shows a second embodiment of a system according to the invention. Contrary to the first embodiment, the second embodiment comprises 17 magazines 10 which are arranged side by side and different from one another and in which components 2, which are in each case different from one another, are stored. Similarly to the first embodiment, each magazine 10 is assigned a device 6 having an identical mode of operation to the first embodiment. The second device 8 is in this case, contrary to the first embodiment, movably retained on a cross-beam 14. For this purpose, the second device 8 is fixed to a support runner 14.1 which is movable along the cross-beam 14. The support runner 14.1 can be moved automatically and in a reciprocating manner along the cross-beam 14, such that the second device 8 of this embodiment can be positioned relative to each of the first devices 6 in a similar manner to the first embodiment. The drive of the cross-beam 14 or of the support runner 14.1 can for example likewise be constructed as a servo shaft.

Figure 6:
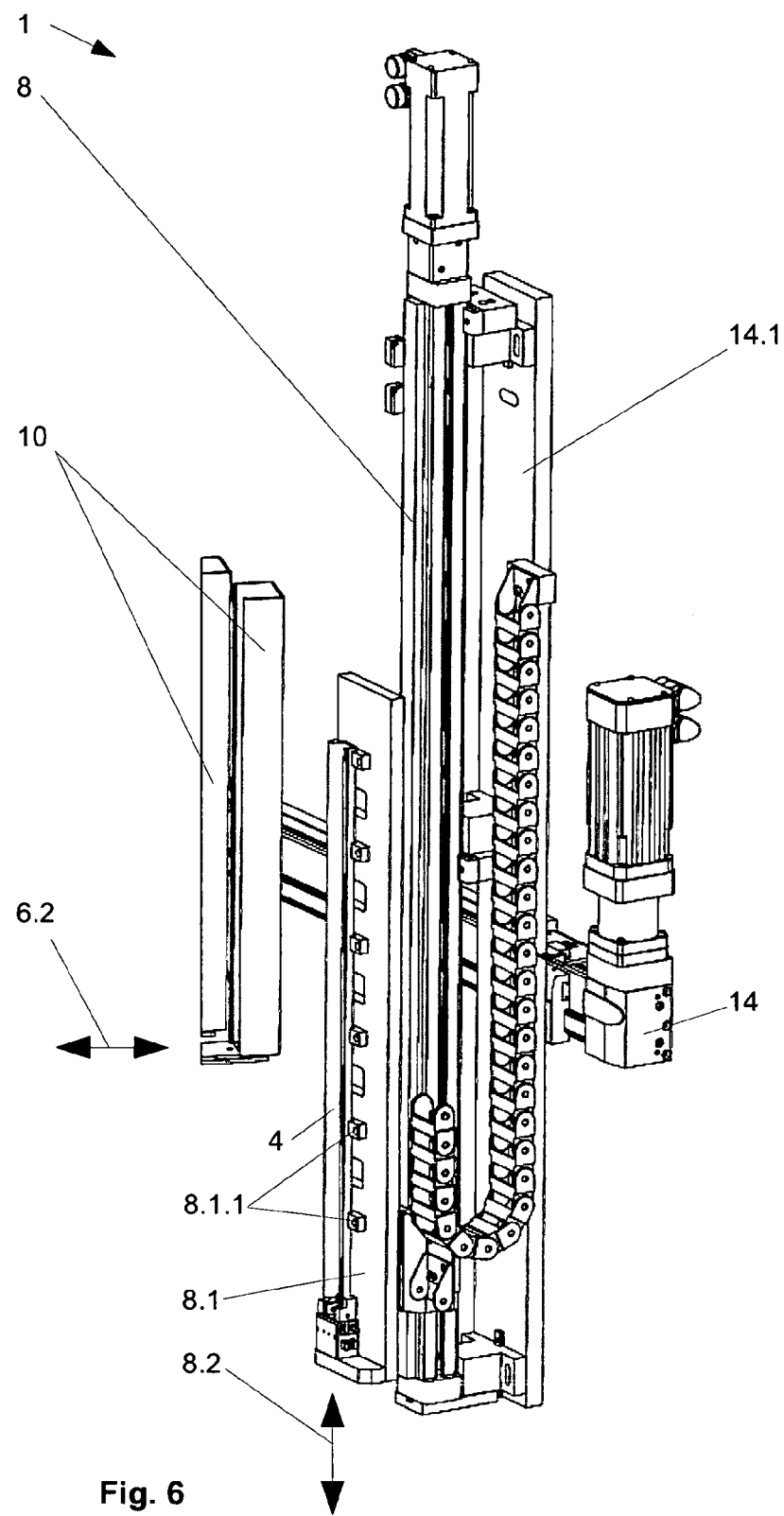
FIG. 6 shows the second embodiment in a detailed view of the region boxed in FIG. 5.

In other respects, the mode of operation corresponds to that of the first embodiment. FIG. 6 is an enlarged view of the region squared in FIG. 5. As can clearly be seen from FIG. 6, the support rail 4 constructed as a perforated rail is in this case detachably retained by hook-like projections 8.1.1 of the runner 8.1 on the second device 8.

The invention is not limited to the above-mentioned embodiments. The first and second devices can be freely selected within wide, suitable limits. For example, the devices may comprise other types of drive, such that, in principle, other movement paths and thus movement sequences are also possible. In particular, the second device may be constructed as a robot. The robot can likewise perform the function of the cross-beam from the first embodiment. Even the number of magazines is not limited to the above-mentioned numbers. As regards the components, these may be any type of electrical terminal or alternative electrical or non-electrical components. The same applies to the support rail, which is likewise not limited to the geometry of a top hat rail or of a perforated rail. It is also possible to orientate the two devices in a spatially alternative manner with respect to one another.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 System
2 Component
2.1 Hook-like projection
2.2 Hook-like projection
4 Support rail
4.1 Projecting edge region
4.2 Projecting edge region
6 First device
6.1 Receiving means
6.2 Movement axis of the first device
6.3 Bearing portion
6.3.1 Bolt
6.3.2 Spring
6.4 Sliding guide
6.5 Sliding block
6.6 Movable part
6.7 Immovable part
8 Second device
8.1 Runner
8.1.1 Hook-like projections
8.2 Movement axis of the second device
10 Magazine
12 Clamping device
14 Cross-beam
14.1 Support runner

The invention claimed is:

1. A method for mounting components on a support rail, the method comprising:
removing a first of the components from at least one magazine;
retaining the support rail in a first mounting position by a second device;
placing the first of the components onto the support rail by a first device having a receiver for the components and being operable to move in an automatic and reciprocating manner between a starting position and an end position;
automatically transferring, by the second device, the support rail into a second mounting position after the placing the first of the components and retaining the support rail in the second mounting position, and
placing a second of the components onto the support rail retained in the second mounting position, wherein the second of the components is arranged adjacently to the first of the components in a longitudinal direction of the support rail in a fully loaded state thereof.

2. The method according to claim 1, wherein the second device retains the support rail in the mounting positions relative to the first device in such a way that the first device can, in a single linear movement during transfer from the starting position to the end position, remove a component from the magazine and carry that component to the support rail.

3. The method according to claim 2, wherein the single linear movement of the first device brings edge regions of that component and the support rail into contact in a first movement portion and rotates that component about a pivot into an end position relative to the support rail in a second movement portion.

4. The method according to claim 3, wherein during the second movement portion, the single linear movement of the first device transfers that component first into an intermediate position and, after a period of time, into the end position.

5. The method according to claim 3 wherein the first device, at the end of the single linear movement and prior to being transferred back into the starting position, remains in the end position for a predetermined waiting time and,
wherein, during the waiting time, the second device presses the components already placed on the support bar against the first device with a predetermined force.

6. The method of claim 1, wherein the components are terminal blocks.

* * * * *